United States Patent
Aoki et al.

(10) Patent No.: US 7,538,970 B2
(45) Date of Patent: May 26, 2009

(54) STORAGE APPARATUS, STORAGE APPARATUS CONTROL METHOD, AND COMPUTER PRODUCT

(75) Inventors: Takahiro Aoki, Kawasaki (JP); Shunji Saitou, Kawasaki (JP); Takao Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 11/322,025

(22) Filed: Dec. 29, 2005

(65) Prior Publication Data

US 2007/0064337 A1 Mar. 22, 2007

(30) Foreign Application Priority Data

Sep. 22, 2005 (JP) .............................. 2005-276641

(51) Int. Cl.
G11B 5/596 (2006.01)
(52) U.S. Cl. .................................................. 360/78.04
(58) Field of Classification Search .................. None
See application file for complete search history.

(56) References Cited

U.S. PATENT DOCUMENTS

| | | | | |
|---|---|---|---|---|
| 5,570,332 A | * | 10/1996 | Heath et al. ................. 369/30.1 |
| 6,809,896 B2 | * | 10/2004 | Espeseth et al. ........... 360/78.07 |
| 6,865,048 B2 | * | 3/2005 | Koizumi et al. ................ 360/69 |
| 7,061,714 B1 | * | 6/2006 | Yu ............................ 360/78.07 |

FOREIGN PATENT DOCUMENTS

| | | |
|---|---|---|
| JP | 63-087663 | 4/1988 |
| JP | 1-245471 | 9/1989 |
| JP | 6-325517 | 11/1994 |
| JP | 10-326470 | 12/1998 |

* cited by examiner

Primary Examiner—K. Wong
(74) Attorney, Agent, or Firm—Greer, Burns & Crain, Ltd.

(57) ABSTRACT

A seek-information storing unit stores seek information including a correlation between a seek distance indicating a shift distance from a current track to a target track where a target frame for a data input/out is located and a seek time indicating a shifting time that takes for a head to shift from the current track to the target track, based on an actual measurement. A head-shift control unit controls a shift of the head based on an estimated time obtained by adding a rotational delay time that takes until the target frame arrives at the head position after the head arrives at the target track to the seek time acquired from the seek information.

17 Claims, 10 Drawing Sheets

FIG.1
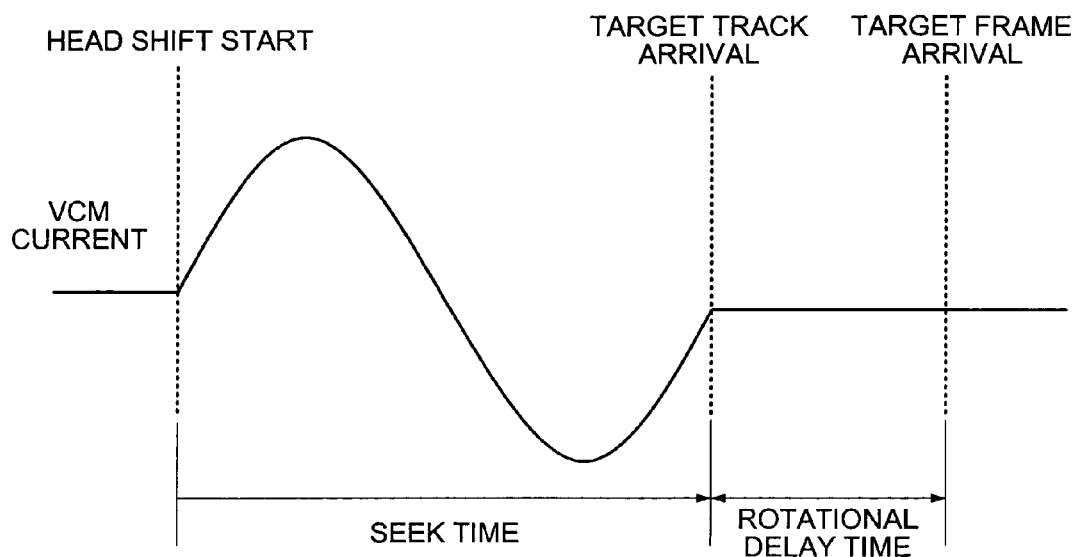
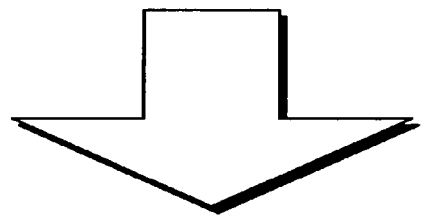
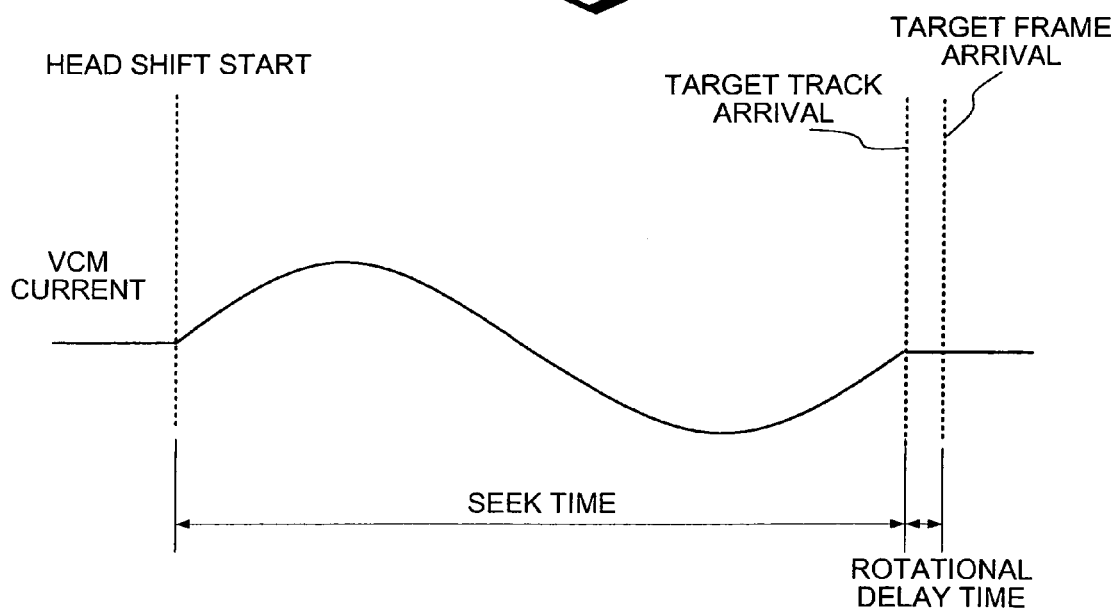

| SEEK PROFILE A | |
|---|---|
| SEEK DISTANCE [Track] | SEEK TIME [ms] |
| 5 | 1 |
| 20 | 2 |
| 50 | 3 |
| 500 | 4 |
| 1000 | 6 |
| 10000 | 10 |
| ⋮ | ⋮ |

STORAGE APPARATUS, STORAGE APPARATUS CONTROL METHOD, AND COMPUTER PRODUCT

BACKGROUND OF THE INVENTION

1. Field of the Invention

The present invention relates to a technology for realizing both silence and performance at a low cost in a storage apparatus having a disk-like recording medium and a movable head.

2. Description of the Related Art

A storage apparatus that performs a data input/output with respect to a disk-like (circular) recording medium, such as a hard disk drive, is currently in use. In such a storage apparatus, a movable head is shifted to a predetermined position on a disk by a driving device such as a voice coil motor (VCM), for the data input/output. Because needs for a speedup of data access is increasing, there is a tendency that a shifting speed of the head is also increasing.

In addition to the needs for the speedup of data access, there are also needs for assuring silence of the storage apparatus. Particularly, in recent years, because of market needs that emphasizes silence of a personal computer and the like, the silence of the storage apparatus (for example, the hard disk drive) to be loaded is also demanded.

However, in a conventional hard disk drive, when an improvement in the shifting speed of a head is intended, the noise (seek noise) level is raised by a rapid change in VCM current resulting from an acceleration/deceleration of the head. In other words, there is a trade-off between a reduction of the seek noise and the speedup of data access.

For example, Japanese Published Unexamined Patent Application No. H10-326470 discloses a technique for preparing-several-types of voltage waveforms to be applied to the VCM and allowing a user to select a mode where data access time is long despite a small seek noise or a mode where data access time is short despite a large seek noise.

However, because the above technique is for selecting either a reduction in seek noise or a reduction in data access time, both a reduction in seek noise (silence) and reduction in data access time (performance) cannot be realized.

Both the reduction in seek noise and the reduction in data access time can be realized by soundproofing of noise (seek noise) generated due to a speedup of head shifting speed. However, if a disk drive is covered with a cover containing a sound absorbing material or the cover itself is thickened, a problem of increasing manufacturing cost or an increase in the size of the drive itself arises.

Based on these circumstances, there has been a major challenge in how to realize the hard disk drive having both silence and performance at a low cost. Such a challenge is common, not limited to hard disk drives, for other storage apparatuses (for example, optical disk drives) in general that use movable heads for data access.

SUMMARY OF THE INVENTION

It is an object of the present invention to at least solve the problems in the conventional technology.

A storage apparatus according to one aspect of the present invention, having a disk-like recording medium on which a plurality of tracks including a plurality of frames is formed and a movable head that performs a data input/output with respect to the frames, includes a seek-information storing unit that stores seek information including a correlation between a seek distance indicating a shift distance from a current track to a target track where a target frame for the data input/out is located and a seek time indicating a shifting time that takes the head to shift from the current track to the target track, based on an actual measurement; and a head-shift control unit that controls a shift of the head based on an estimated time obtained by adding a rotational delay time that takes until the target frame arrives at the head position after the head arrives at the target track to the seek time acquired from the seek information.

A method according to another aspect of the present invention is for controlling a storage apparatus having a disk-like recording medium on which a plurality of tracks including a plurality of frames is formed and a movable head that performs a data input/output with respect to the frames. The method includes storing seek information including a correlation between a seek distance indicating a shift distance from a current track to a target track where a target frame for the data input/out is located and a seek time indicating a shifting time that takes the head to shift from the current track to the target track, based on an actual measurement; and controlling a shift of the head based on an estimated time obtained by adding a rotational delay time that takes until the target frame arrives at the head position after the head arrives at the target track to the seek time acquired from the seek information.

A computer-readable recording medium according to still another aspect of the present invention stores a computer program that causes a computer to execute the above method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic for illustrating an outline of a control method according to the present invention;

DETAILED DESCRIPTION OF THE PREFERRED EMBODIMENTS

Exemplary embodiments of the present invention will be explained in detail with reference to the accompanying drawings. In the following explanation, the present invention is applied to a hard disk drive.

FIG. 1 is a schematic for illustrating an outline of a control method according to the present invention. The graph shown in the upper part of FIG. 1 is a graph of a change in VCM current of a conventional hard disk drive, while the graph shown in the lower part is a graph of a change in VCM current of a hard disk drive to which a control method according to the present invention has been applied.

As shown in the upper graph of FIG. 1, in the conventional hard disk drive, head shifting speed has been controlled while taking into consideration a time (seek time) after a head shifts until the head arrives at a target track (track where a frame to be a target of data access is present). However, shifting speed control taking into consideration a time (rotational delay time) after a head arrives at a target track until a target frame arrives at directly under the head has not been performed.

Figure 2:
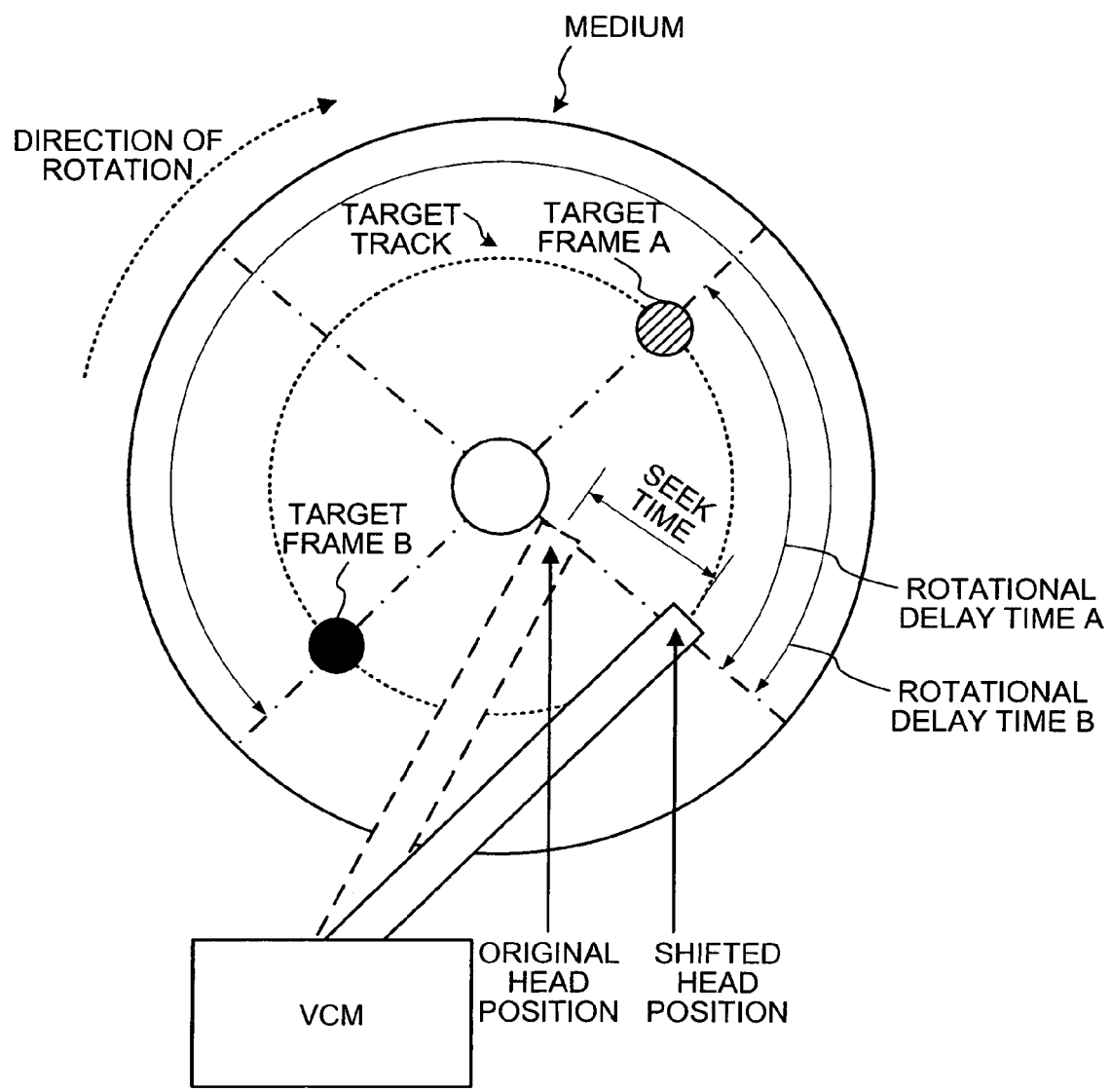
FIG. 2 is a schematic for illustrating a rotational delay time and a seek time.

Therefore, when the rotational delay time is sufficient, the head arrives at the target track earlier and stands by for the target frame to rotate and arrive. Namely, the head has been shifted at an unnecessarily high speed in the conventional disk drive, and this has contributed to increasing seek noise. FIG. 2 is a schematic for illustrating a rotational delay time and a seek time.

When a target frame is determined, the head that performs data access is subjected to shift control by a VCM based on a distance from a current track position (see the "original head position" of FIG. 2) to a track position (see the "shifted head position" of FIG. 2) where the target frame is contained. At this time, a time required for shifting from the "original head position" to the "shifted head position" is referred to as a "seek time." In addition, a time for which the head waits for the target frame to arrive after arriving at the "shifted head position" is referred to as a "rotational delay time."

The "rotational delay time" results in a time different depending on where the target frame is located in a target track. For example, a target frame A shown in FIG. 2 is present at a position of 90 degrees from the head position, and a target frame B is present at a position of 270 degrees from the head position. Accordingly, the rotational delay time B shown in the figure requires a time three times as long as the rotational delay time A.

If accuracy of an estimated seek time of the head is inferior, the target frame passes through the head position before the head arrives at the target track, so that a necessity for a full-turn wait for an arrival of the target frame arises to cause a decline in data access performance. However, in the control method according to the present invention, by using a seek profile (details will be described later) based on actual measurements, such a decline in performance is prevented.

Returning to the explanation of FIG. 1, a hard disk drive to which a control method according to the present invention has been applied will be described. As shown in the lower graph of FIG. 1, the control method according to the present invention is characterized mainly by, after estimating a seek time and a rotational delay time, performing control to smoothly change head shifting speed so that the rotational delay time being a time for which a head that has arrived at a target track waits for a rotation of a target frame becomes as short as possible. By performing control as such, it becomes possible to reduce seek noise accompanying a head shift.

Moreover, in the control method according to the present invention, because a "seek profile" containing a correlation between seek times and seek distances based on actual measurements is used for the seek time estimation, a seek time can be accurately estimated. Accordingly, it becomes possible to avoid a phenomenon of a full-turn wait for being too late for an arrival of the target frame. Therefore, data access performance is never deteriorated.

Meanwhile, the seek time includes a so-called "settling" time; "settling" is a control operation to stabilize the head at a target track. This settling time has characteristics such that the settling time fluctuates depending on fluctuation factors including a seek distance, a mechanism fluctuation (biasing), and a medium (disk) eccentricity.

Therefore, in conventional hard disk drives, a value provided with a predetermined allowance for a fluctuation of the settling time has been usually anticipated as a maximum settling time. Namely, when estimating a settling time, a time considerably greater than an actual settling time cannot help but be determined as an estimated settling time, and this has been a major obstacle in estimating a seek time.

For example, if less of a settling time is estimated, in a unit (device) that tends to have a large settling time, the head is too late for an arrival of the target frame and waits for a full turn, which results in a deterioration in data access performance. As such, settling time estimation accuracy greatly concerns data access performance.

Therefore, in a control method according to the present invention, by performing a measurement survey of tendencies by building up data of each device on the settling time fluctuation factors, fluctuation amounts according to factors such as a seek distance and a medium (disk) eccentricity are included in the "seek profile" as actual measurements. Accordingly, because settling times can be accurately estimated even when respective devices have individual differences, it becomes possible to improve seek time estimation accuracy. In addition, because the "seek profile" also includes actual measurements on seek times (not including settling times) as times required for shifting between tracks, seek time estimation accuracy can also be improved.

Moreover, in head shift control, a control operation to shift the head to a target track and a control operation to stabilize the head above a target track are usually consecutively performed. And, these control operations are switched over by switching over filters corresponding to the respective control operations.

In the following, the filter used for a control operation to shift the head to a target track is referred to as a "seek filter," and the filter used for a control operation to stabilize the head above a target track, a "settling filter." In the control method according to the present invention, switching timing of the respective filters is controlled by use of the seek time and rotational delay time estimated based on a seek profile so as to avoid a rapid change in VCM current. Accordingly, seek noise accompanying a head shift can be efficiently reduced.

Figure 3:
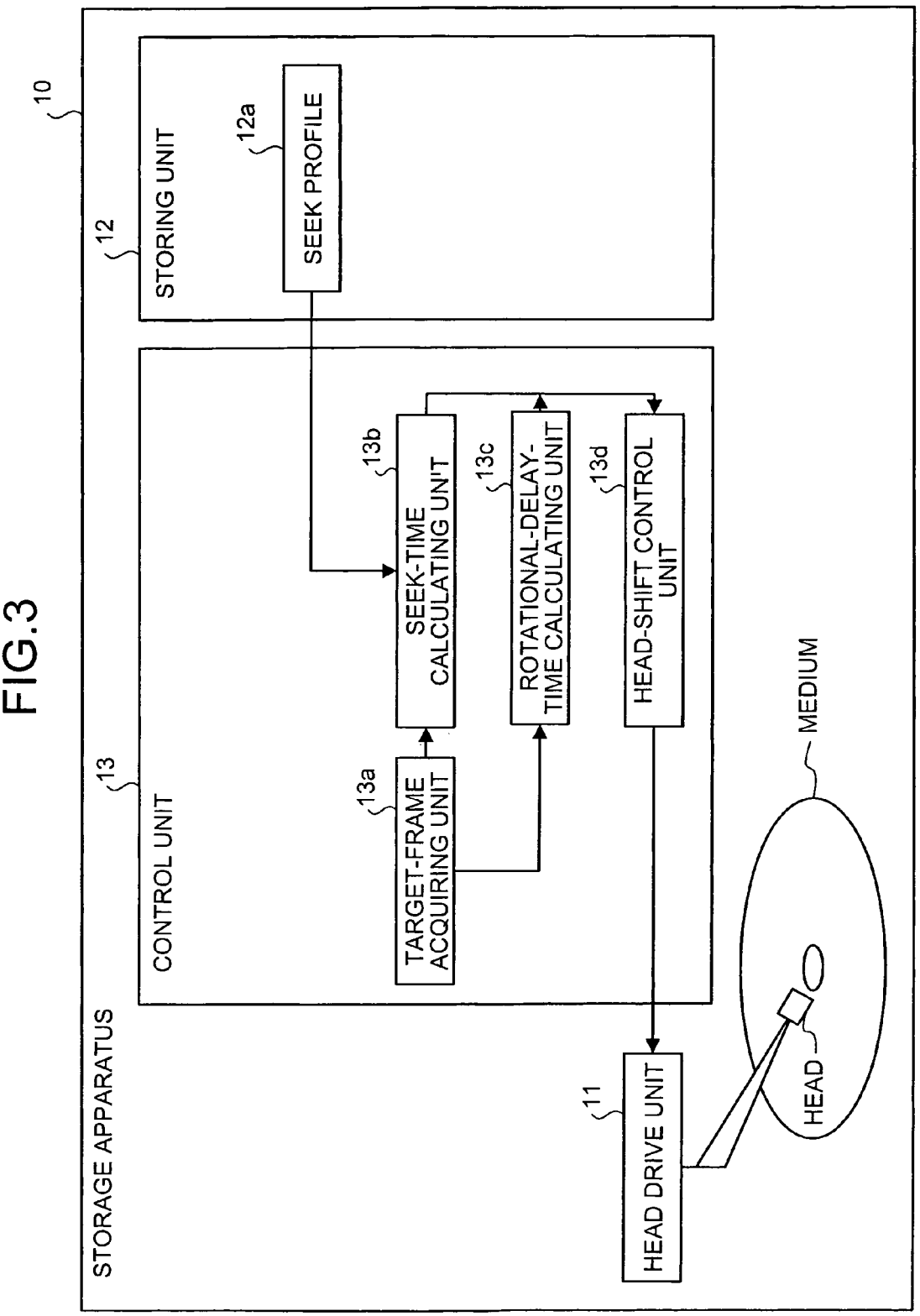
FIG. 3 is a block diagram of a storage apparatus according to the present invention.

FIG. 3 is a block diagram of a storage apparatus 10 according to the present invention. A configuration shown in FIG. 3 shows only factors relevant to a time estimation concerning a seek operation of the head and motion control based on the time estimation from among functions of the storage apparatus 10.

The storage apparatus 10 includes a head drive unit 11 for shifting a movable head that performs data access with respect to a medium (disk), a storage unit 12, and a control unit 13. And, the storage unit 12 stores a seek profile 12a that is information containing a correlation between seek distances and seek times based on actual measurements, and the control unit 13 further includes a target-frame acquiring unit 13a, a seek-time calculating unit 13b, a rotational-delay-time calculating unit 13c, and a head-shift control unit 13d.

The head drive unit 11 is composed of a drive unit such as a VCM (voice coil motor) and a control circuit of the drive unit and performs a process to position a head that performs data access at a predetermined track on the medium (disk) shown in the figure.

Figure 4:
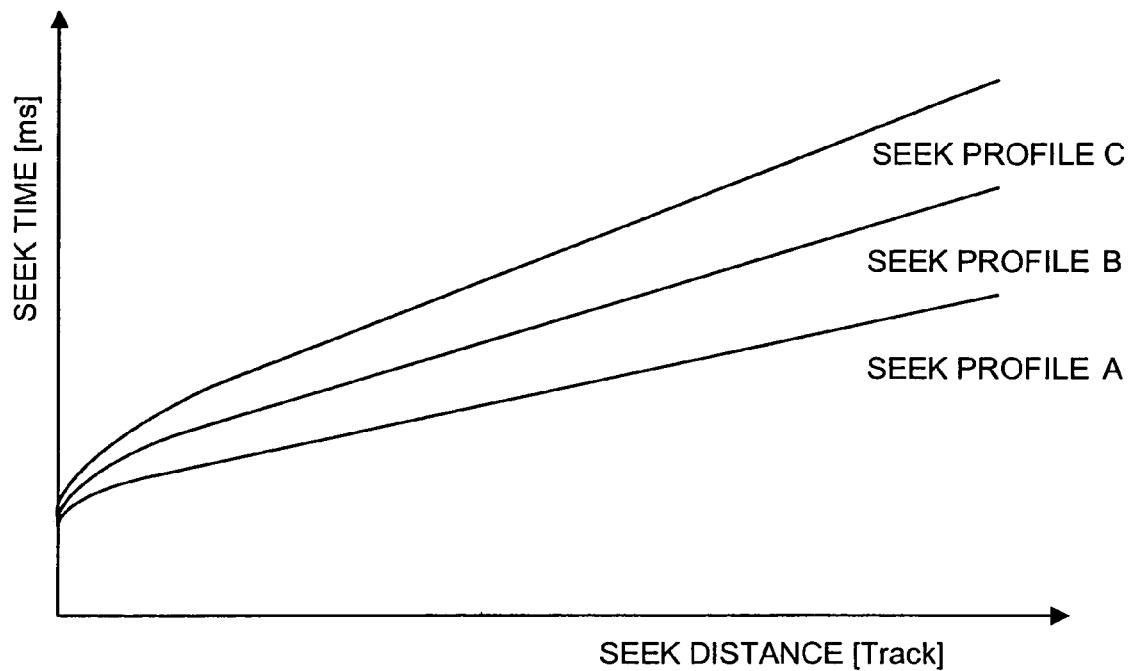
FIG. 4 is a schematic for illustrating an example of a seek profile.

The storage unit 12 is a storage unit composed of a storage device such as a nonvolatile RAM (Random Access Memory)

and stores the seek profile 12a, which is information containing a correlation between seek distances and seek times based on actual measurements. FIG. 4 is a schematic for illustrating an example of the seek profile 12a. Although three seek profiles A to C are shown in the figure, the illustration does not limit the number (type) of seek profiles.

The respective seek profiles (A to C) are information indicating a correlation between seek times and seek distances. For example, the seek profile A is a seek profile when the head is moved fastest among the seek profiles shown in the figure, and the seek profile C is a seek profile when the head is moved slowest. The respective seek profiles are prepared according to a band of the seek filter and are used to change head shifting speed.

In addition, as shown in the table shown in the lower part of FIG. 4, the respective seek profiles are information where seek times for each seek distance (shifting track number) have been tabled. The values shown in the table and the number of lines in the table or respective representative values (such as 5, 20, and 50) of seek distances are merely shown by way of example.

In the storage apparatus 10 according to the present embodiment, the seek profile 12a prepared in advance based on actual measurements is stored in the storage unit 12, and the seek-time calculating unit 13b to be described later calculates a seek time based on the seek profile 12a. Accordingly, it becomes possible to estimate a head seek time with accuracy.

Returning to the explanation of FIG. 3, the control unit 13 is a processing unit that performs a process to calculate a seek time based on positional information of a target frame to be a data access target and the seek profile 12a, calculate a rotational delay time based on positional information of the target frame, and control head operation based on the calculated seek time and rotational delay time. A program such as a firmware loaded on the storage apparatus 10 realizes the respective processing unit functions of the control unit 13.

The target-frame acquiring unit 13a is a processing unit that performs a process to acquire information involving a track where a target frame to be a data access target is present, a position of the target frame in the track, and a track where the head is present necessary for a seek operation and hand over the same to the seek-time calculating unit 13b and the rotational-delay-time calculating unit 13c.

The seek-time calculating unit 13b is a processing unit that calculates, based on the seek profile 12a and the information handed over by the target-frame acquiring unit 13a, a seek time being a time until the head arrives at a target track. For example, when a distance to a target track where a target frame is contained is of 5 tracks and the seek profile A shown in FIG. 4 is used, the seek-time calculating unit 13b calculates (estimates) the seek time at 1 millisecond (see the table of FIG. 4). In the present embodiment, such a seek time includes the settling time.

The rotational-delay-time calculating unit 13c is a processing unit that calculates, based on the time information handed over by the target-frame acquiring unit 13a, a rotational delay time being a time after the head arrives at a target track until a target frame rotates and arrives at the head position. For example, when revolving speed % of the disk is 5400 revolutions per minute and a current position of the target frame is 180 degrees from the head position, the rotational-delay-time calculating unit 13c calculates (estimates) the rotational delay time at 5.56 milliseconds.

The head-shift control unit 13d is a processing unit that performs shift control, based on the seek time and rotational delay time calculated by the seek-time calculating unit 13b and the rotational-delay-time calculating unit 13c, to shift the head to a target track in time with an estimated arrival time of a target frame. In addition, the head-shift control unit 13d is also a processing unit that determines a predetermined gain through the respective filters such as a "seek filter" and a "settling filter" and gives a head shift instruction to the head drive unit 11 based on this determination.

Figure 5:
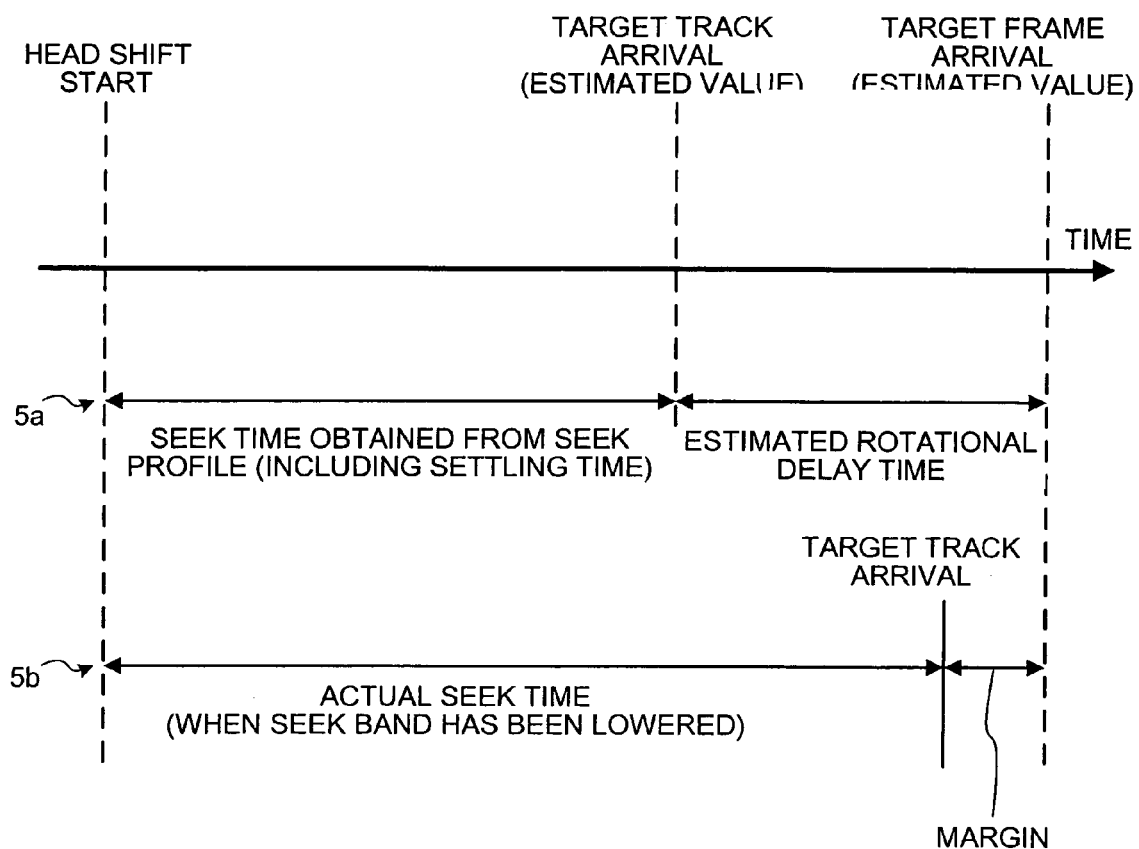
FIG. 5 is a schematic for illustrating an example of a head shift control by a seek band change.

FIG. 5 is a schematic for illustrating an example of a head shift control by a seek band change of the seek filter. A seek time and a rotational delay time estimated by the seek-time calculating unit 13b and the rotational-delay-time calculating unit 13c is indicated as 5a, and contents of shift control performed by the head-shift control unit 13 are indicated as 5b.

The head-shift control unit 13d performs control to approximate a time (settling completion time) where the head arrives at a target track and a preparation for access to the target track is completed to an arrival time of a target frame based on the estimated time shown in 5A of FIG. 5. Concretely, by selecting a seek profile when the seek band has been lowered among the respective seek profiles shown in FIG. 4, such control as to slow a change in speed of the head is performed. By controlling as such, because a rapid change in VCM current can be suppressed, it becomes possible to reduce seek noise.

The "margin" shown in 5B of the figure is a buffer value to prevent, when a gap between an estimated time until the head arrives at a target frame and an actual arrival time arises, failure in access to the target frame. However, in the present embodiment, the estimated time is high in accuracy because the seek profile 12a based on actual measurements is to be used. Accordingly, in comparison with a conventional method, such a buffer value can be provided as a small value.

Figure 6:
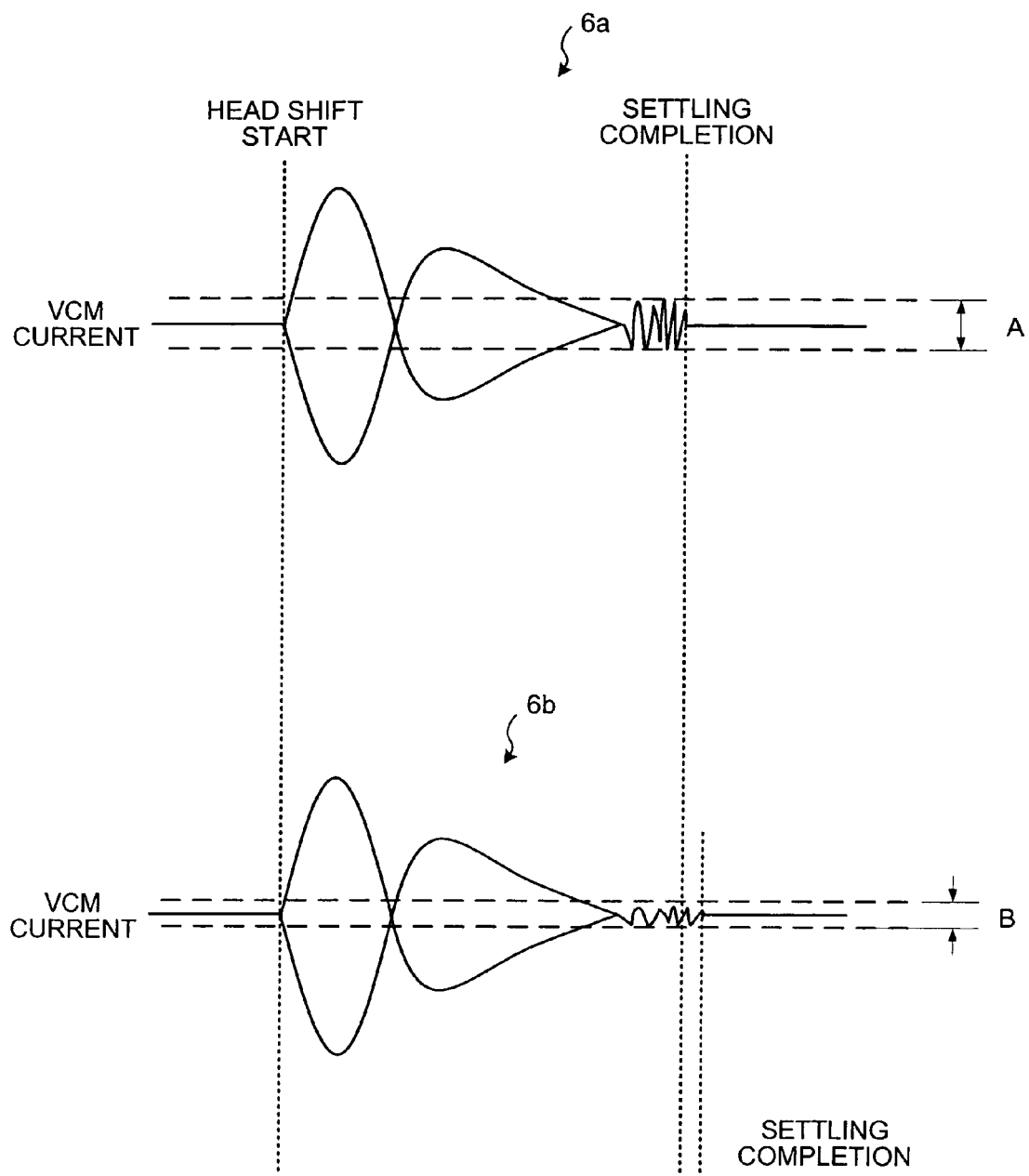
FIG. 6 is a schematic for illustrating an example of the head shift control by a change in settling conditions.

FIG. 6 is a schematic for illustrating an example of the head shift control by a change in settling conditions. A graph indicated by 6a shows settling conditions used in a conventional method. A graph indicated by 6b is a graph of settling conditions used in the present invention.

As shown in 6b, in the conventional method, because estimation accuracy of a time until the head arrives at a target frame is low, it has been necessary to make the head arrive at a target track early. Therefore, as switching conditions (settling conditions) from the seek filter to the settling filter, easy slice conditions (see A of FIG. 6) have been set. On the other hand, because estimation accuracy of an estimated time according to the present embodiment is high as described above, head shifting speed can be reduced. Namely, timing of a settling completion can be delayed more than that of the conventional method.

Namely, the easy slice conditions (A in FIG. 6) that have been used in the conventional method can be changed to severe slice conditions (B in FIG. 6). Accordingly, it becomes possible to control a change in VCM current when switching the seek filter to the settling filter, which allows suppressing seek noise. In other words, because a settling operation using the settling filter can be performed in a condition where the head has arrived at a target track due to a seek operation using the seek filter and a vibration owing to such a shift has subsided, a change in VCM current resulting from a filter switching can be efficiently suppressed.

Figure 7:
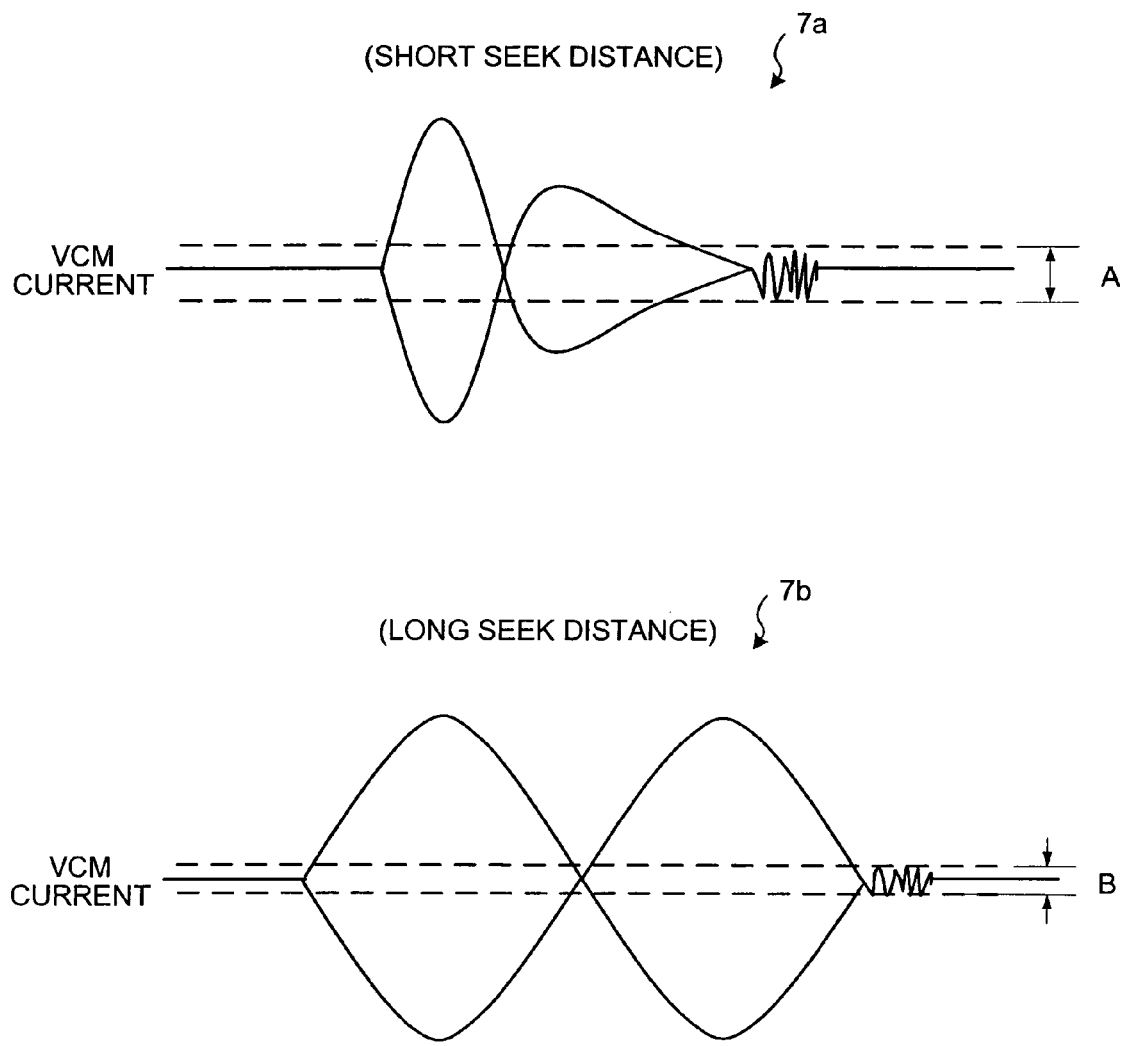
FIG. 7 is a schematic for illustrating a change in the settling conditions according to a seek distance.

FIG. 7 is a schematic for illustrating a change in the settling conditions according to a seek distance. A graph indicated by 7a is of settling conditions when the seek distance is short. A graph indicated by 7b is of settling conditions when the seek distance is long.

The settling conditions (slice conditions A) when the seek distance is short have been set easier than settling conditions (slice conditions B) when the seek distance is long. Namely, when the seek distance is short, because there is no an allowance for time until the head arrives at a target frame, it is necessary to set easy settling conditions. On the other hand, when the seek distance is long, because there is an allowance for time until the head arrives at a target frame, severe settling conditions may be set.

As such, the head-shift control unit 13d performs control to change settling conditions according to the length of a seek distance, seek noise can be reduced without a decline in data access performance. Although, in FIG. 7, the two examples of settling conditions when the seek distance is short and settling conditions when the seek distance is long have been shown, it is also possible to change the settling conditions in multiple steps according to the seek distance.

Figure 8:
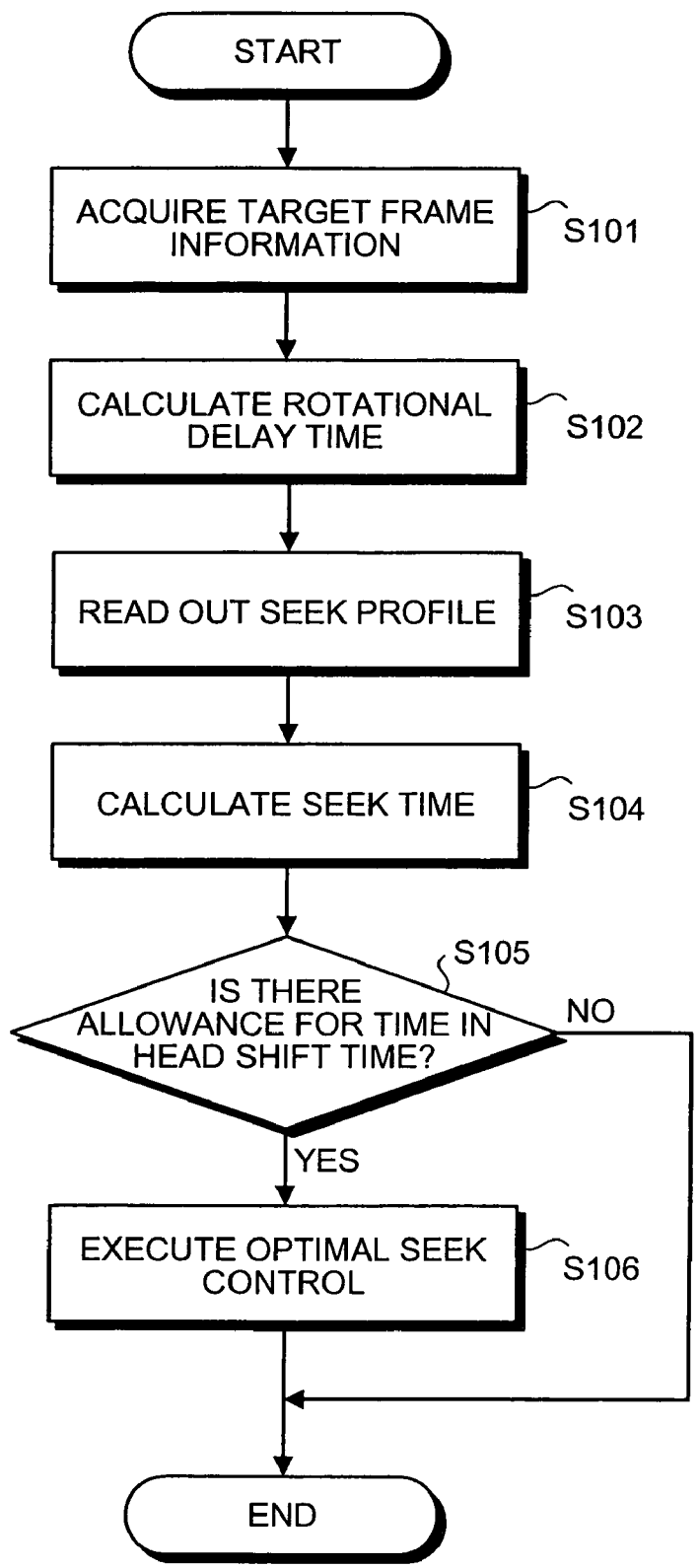
FIG. 8 is a flowchart of a processing procedure for a head shift control process.

FIG. 8 is a flowchart of a processing procedure for a head shift control process. When the target-frame acquiring unit 13a acquires target frame information (step S10), the rotational-delay-time calculating unit 13c calculates a rotational delay time based on the target frame information handed over by the target-frame acquiring unit 13a (step S102).

In addition, the seek-time calculating unit 13b reads out the seek profile 12a from the storage unit 12 (step S103), and calculates a seek time based on the seek profile 12a and the target frame information handed over by the target-frame acquiring unit 13a (step S104).

Subsequently, the head-shift control unit 13d judges as to whether there is an allowance for time in head shift time (step S105), and the head-shift control unit 13d executes, when judging that there is an allowance for time in head shift time (step S105, Yes), the optimal seek control (motion control with a suppressed change in head speed) (step S106). On the other hand, when judging that there is no allowance for time in head shift time (step S105, No), the head-shift control unit 13d ends the process without performing the process of step S106.

Although, in FIG. 8, the rotational delay time calculating procedure (step S102) and seek time calculating procedure (step S104) that are performed in order have been shown, it is also possible to perform the processing procedure of step S102 and the processing procedures of step S103 and step S104 in parallel.

Figure 9:
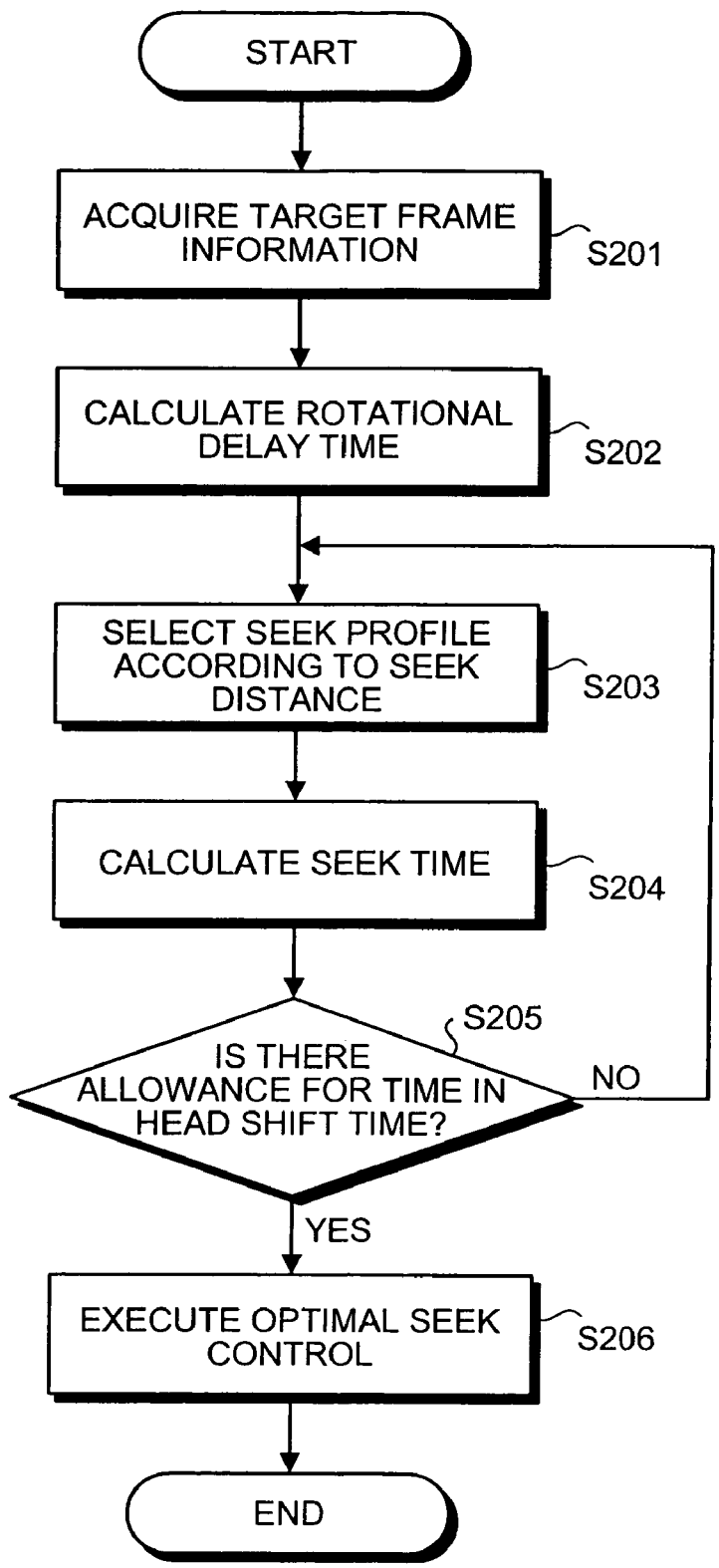
FIG. 9 is a flowchart of a processing procedure for a modification of the head shift control process.

FIG. 9 is a flowchart of a processing procedure for a modification of the head shift control process. When the target-frame acquiring unit 13a acquires target frame information (step S201), the rotational-delay-time calculating unit 13c calculates a rotational delay time based on the target frame information handed over by the target-frame acquiring unit 13a (step S202).

In addition, the seek-time calculating unit 13b reads out the seek profile 12a from the storage unit 12, and selects an optimal seek profile according to the seek distance (step S203). Then, the seek-time calculating unit 13b calculates a seek time based on the selected seek profile and the target frame information handed over by the target-frame acquiring unit 13a (step S204).

Subsequently, the head-shift control unit 13d judges as to whether there is an allowance for time in head shift time (step S205), and the head-shift control unit 13d executes, when judging that there is an allowance for time in head shift time (step S205, Yes), the optimal seek control (motion control with a suppressed change in head speed) (step S206). On the other hand, when the head-shift control unit 13d judges that there is no allowance for time in head shift time (step S205, No), the processes of step S203 onward are repeated to again select a seek profile.

Figure 10:
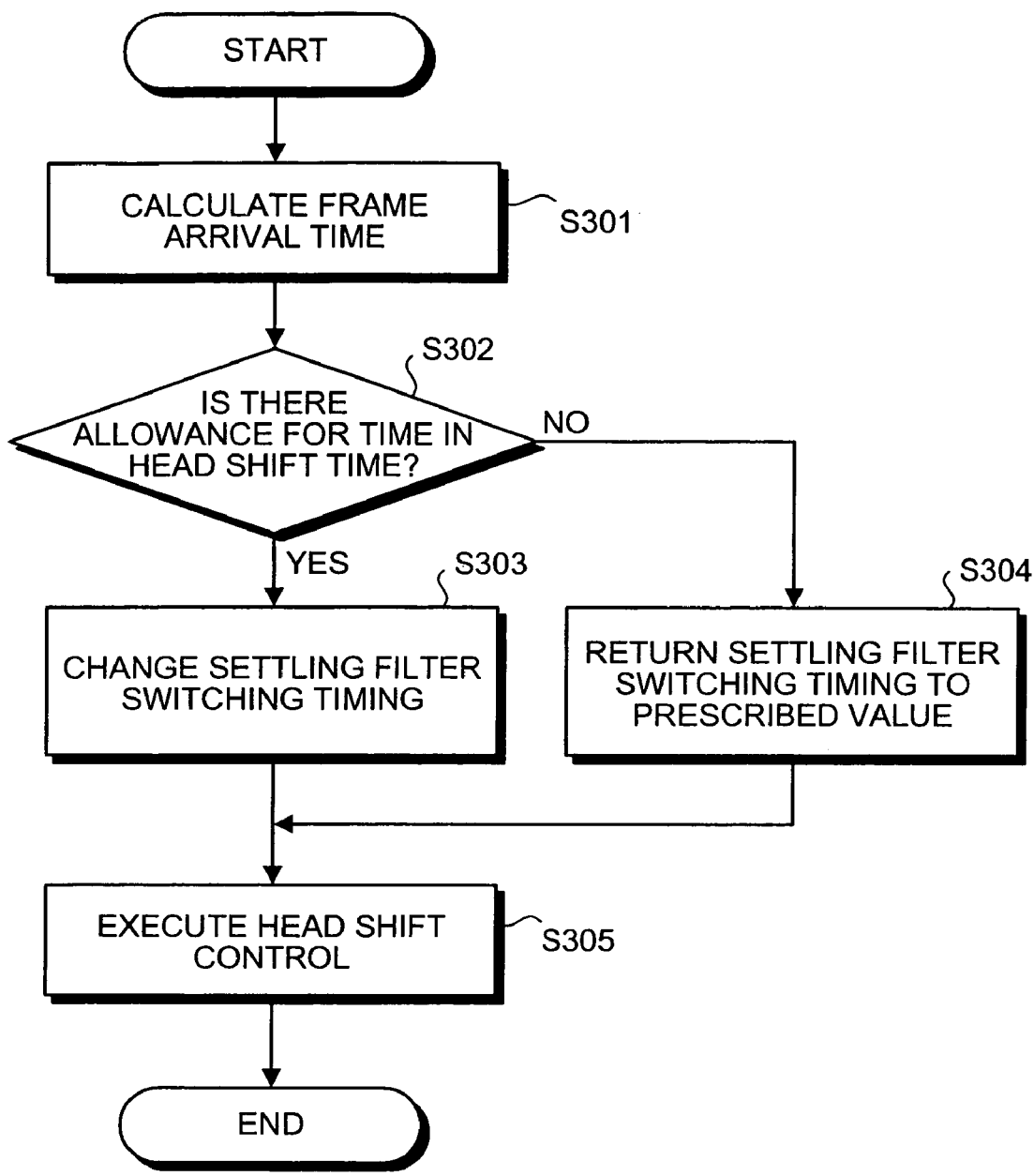
FIG. 10 is a flowchart of a processing procedure for a settling filter switching process.

FIG. 10 is a flowchart of a processing procedure for a settling filter switching process. The head-shift control unit 13d calculates a frame arrival time (seek time+rotational delay time) (step S301), and judges as to whether there is an allowance for time in head shift time (step S302).

Then, the head-shift control unit 13d changes, when judging that there is an allowance for time in head shift time (step S302, Yes), settling filter switching timing to be delayed (step S303). On the other hand, the head-shift control unit 13d returns, when judging that there is no allowance for time in head shift time (step S302, No), settling filter switching timing to a prescribed value (step S304)). Subsequently, the head-shift control unit 13d executes head shift control based on a set settling filter switching timing (step S305), and ends the process.

Although, in the explanation of FIG. 10, a term "settling filter switching timing" has been used, this term corresponds to slice conditions used in the explanation of FIG. 6 or FIG. 7. Namely, when the slice conditions are set severe, the settling filter switching timing becomes delayed. On the other hand, when the slice conditions are set easy, the settling filter switching timing becomes early.

As described above, according to the present embodiment, the seek-time calculating unit calculates by using target frame positional information acquired by the target-frame acquiring unit and a seek profile based on actual measurements, the rotational-delay-time calculating unit calculates a rotational delay time based on the target frame positional information acquired by the target-frame acquiring unit, and based on the calculated seek time and rotational delay time, the head-shift control unit performs shift control of the head so as to approximate an arrival of the head at a target track to a time where a target frame arrives at the head position, therefore, the time where the head arrives at a target frame can be accurately estimated, and it becomes possible to delay arrival of the head at the target frame. Therefore, seek noise can be reduced without a decline in data access performance.

The control method presents effects on a reduction in seek noise regarding a write seek operation, in particular, by applying the same on a seek operation regarding data writing. On the other hand, with regard to a seek operation regarding data reading, with a pre-read function in mind, it is impossible to definitely say that a decline in performance never occurs if the head is in time for the target frame. However, by applying the control method to a read seek after tuning the control method, effects of the present method can be obtained.

For example, by setting the "margin" time shown in 5B of FIG. 5 larger than that in a case of a write seek, compatibility with a pre-read function can be realized. In addition, by setting frequency to execute the optimal seek control explained by use of FIG. 8 ad FIG. 9 smaller than that in a case of a write seek as well, compatibility with a pre-read function can be realized.

As described above, according to the present invention, a seek noise can be reduced without a decline in data access performance, a product cost can be effectively suppressed, and a power consumption relating to a seek operation can be suppressed.

Furthermore, according to the present invention, a rapid change in a current applied to a device to drive the head can be suppressed, and a seek sound caused by the rapid change in the current can be efficiently reduced.

Moreover, according to the present invention, accuracy in an estimated time can be improved.

Furthermore, according to the present invention, a seek noise can be reduced without a decline in data access performance.

Moreover, according to the present invention, a change in current applied to a motor can be effectively suppressed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage apparatus having a disk-like recording medium on which a plurality of tracks including a plurality of frames is formed and a movable head that performs a data input/output with respect to the frames, the storage apparatus comprising:
    a seek-information storing unit that stores seek information including a correlation between a seek distance and a seek time based on an actual measurement, the seek distance indicating a shift distance from a current track to a target track where a target frame for the data input/output is located, the seek time indicating a shifting time that it takes to shift the head from the current track to the target track;
    a rotational delay time calculating unit that calculates a rotational delay time that the head stands by until the target frame arrives at a position of the head after the head arrives at the target track; and
    a head-shift control unit that controls a shift of the head based on the rotational delay time and the seek time acquired from the seek information, wherein
    the head-shift control unit further obtains an estimated time by adding the rotational delay time to the seek time, and controls the shift of the head from the current track to the target track based on the estimated time.

2. The storage apparatus according to claim 1, wherein the seek information is information prepared for each band of a seek filter used for a seek operation of the head.

3. The storage apparatus according to claim 1, wherein the seek time includes a settling time required for settling the head at the target track.

4. The storage apparatus according to claim 1, wherein when the estimated time is longer than the shift time by a predetermined time, the head-shift control unit controls the shift of the head in such a manner that a time for the head to arrive at the target track becomes close to the estimated time by slowing down a shifting speed of the head.

5. The storage apparatus according to claim 1, wherein the head-shift control unit suppresses a change of current of a motor that drives the head, by reducing a band of a seek filter used for a seek operation of the head.

6. The storage apparatus according to claim 5, wherein the seek time includes a settling time required for settling of the head at the target track, and
    the head-shift control unit suppresses the change of current of the motor, by delaying timing of switching from the seek filter to a settling filter used for controlling the settling.

7. The storage apparatus according to claim 6, wherein the head-shift control unit changes the timing of the switching from the seek filter to the settling filter according to the seek distance.

8. A method of controlling a storage apparatus having a disk-like recording medium on which a plurality of tracks including a plurality of frames is formed and a movable head that performs a data input/output with respect to the frames, the method comprising:
    storing seek information including a correlation between a seek distance and a seek time based on an actual measurement, the seek distance indicating a shift distance from a current track to a target track where a target frame for the data input/output is located, the seek time indicating a shifting time that it takes the head to shift from the current track to the target track;
    calculating a rotational delay time that the head stands by until the target frame arrives at a position of the head after the head arrives at the target track; and
    controlling a shift of the head based on the rotational delay time and the seek time acquired from the seek information, wherein
    the controlling includes further obtaining an estimated time by adding the rotational delay time to the seek time, and controlling the shift of the head from the current track to the target track based on the estimated time.

9. The method according to claim 8, wherein the seek information is information prepared for each band of a seek filter used for a seek operation of the head.

10. The method according to claim 8, wherein the seek time includes a settling time required for settling the head at the target track.

11. The method according to claim 8, wherein when the estimated time is longer than the shift time by a predetermined time, the controlling includes controlling the shift of the head in such a manner that a time for the head to arrive at the target track becomes close to the estimated time by slowing down a shifting speed of the head.

12. The method according to claim 8, wherein the controlling includes suppressing a change of current of a motor that drives the head, by reducing a band of a seek filter used for a seek operation of the head.

13. A computer-readable recording medium that stores a computer program for controlling a storage apparatus having a disk-like recording medium on which a plurality of tracks including a plurality of frames is formed and a movable head that performs a data input/output with respect to the frames, wherein
    the computer program causes a computer to execute:
        storing seek information including a correlation between a seek distance and a seek time based on an actual measurement, the seek distance indicating a shift distance from a current track to a target track where a target frame for the data input/output is located, the seek time indicating a shifting time that it takes the head to shift from the current track to the target track;
        calculating a rotational delay time that the head stands by until the target frame arrives at a position of the head after the head arrives at the target track; and
        controlling a shift of the head based on the rotational delay time and the seek time acquired from the seek information, wherein
        the controlling includes further obtaining an estimated time by adding the rotational delay time to the seek time, and controlling the shift of the head from the current track to the target track based on the estimated time.

14. The computer-readable recording medium according to claim 13, wherein
    the seek information is information prepared for each band of a seek filter used for a seek operation of the head.

15. The computer-readable recording medium according to claim 13, wherein
    the seek time includes a settling time required for settling the head at the target track.

16. The computer-readable recording medium according to claim 13, wherein
when the estimated time is longer than the shift time by a predetermined time, the controlling includes controlling the shift of the head in such a manner that a time for the head to arrive at the target track becomes close to the estimated time by slowing down a shifting speed of the head.

17. The computer-readable recording medium according to claim 13, wherein
the controlling includes suppressing a change of current of a motor that drives the head, by reducing a band of a seek filter used for a seek operation of the head.

* * * * *